(12) United States Patent
Kojima et al.

(10) Patent No.: US 10,047,697 B2
(45) Date of Patent: Aug. 14, 2018

(54) METAL-RUBBER LAMINATE MATERIAL

(75) Inventors: Yoshifumi Kojima, Kanagawa (JP);
Atsushi Yokoto, Kanagawa (JP);
Toshihiro Higashira, Kanagawa (JP)

(73) Assignee: NOK Corporation, Tokyo (JP)

( * ) Notice: Subject to any disclaimer, the term of this patent is extended or adjusted under 35 U.S.C. 154(b) by 451 days.

(21) Appl. No.: 13/977,837

(22) PCT Filed: Jan. 6, 2012

(86) PCT No.: PCT/JP2012/050135
§ 371 (c)(1),
(2), (4) Date: Jul. 1, 2013

(87) PCT Pub. No.: WO2012/096222
PCT Pub. Date: Jul. 19, 2012

(65) Prior Publication Data
US 2013/0285334 A1 Oct. 31, 2013

(30) Foreign Application Priority Data
Jan. 12, 2011 (JP) .................... 2011-003578

(51) Int. Cl.
*B32B 15/06* (2006.01)
*F02F 11/00* (2006.01)
*F16J 15/08* (2006.01)
*F16J 15/12* (2006.01)

(52) U.S. Cl.
CPC .............. *F02F 11/00* (2013.01); *B32B 15/06* (2013.01); *F16J 15/0818* (2013.01); *F16J 15/122* (2013.01); *B32B 2255/10* (2013.01); *B32B 2581/00* (2013.01); *B32B 2605/08* (2013.01); *F16J 2015/0856* (2013.01); *Y10T 428/254* (2015.01); *Y10T 428/3154* (2015.04); *Y10T 428/31569* (2015.04)

(58) Field of Classification Search
None
See application file for complete search history.

(56) References Cited

U.S. PATENT DOCUMENTS

| | | | | |
|---|---|---|---|---|
| 5,130,293 A * | 7/1992 | Saito | ............... | B41M 5/38214 428/913 |
| 6,509,099 B1 * | 1/2003 | Urata | ............. | B05D 7/14 428/423.1 |
| 7,067,182 B2 * | 6/2006 | Li | ............. | B65D 23/0828 428/35.7 |
| 2002/0127411 A1 * | 9/2002 | Murakami | ............. | B32B 15/06 428/423.9 |
| 2010/0086769 A1 * | 4/2010 | Yokota | ............. | B32B 7/12 428/327 |
| 2010/0136352 A1 * | 6/2010 | Higashira | ............. | B32B 15/06 428/462 |

FOREIGN PATENT DOCUMENTS

| | | |
|---|---|---|
| JP | 2-59362 | 4/1990 |
| JP | 3-124075 | 12/1991 |
| JP | 2002-130480 | 5/2002 |
| JP | 2003-213122 | 7/2003 |
| JP | 2008-260809 | 10/2008 |

OTHER PUBLICATIONS

International Preliminary Report on Patentability and Written Opinion from corresponding PCT application No. PCT/JP2012/050135 (7 pgs).
International Search Report from corresponding PCT application No. PCT/JP2012/050135 dated Apr. 17, 2012 (4 pgs).

* cited by examiner

*Primary Examiner* — Elizabeth A Robinson
*Assistant Examiner* — Daniel D Lowrey
(74) *Attorney, Agent, or Firm* — Brinks Gilson & Lione

(57) ABSTRACT

Disclosed is a metal-rubber laminate material comprising a metal plate, a rubber layer formed on the surface of the metal plate, and a solid lubricant layer formed on the rubber layer, the solid lubricant layer comprising an isocyanate group-containing urethane prepolymer, a synthetic wax having a softening point of 40 to 150° C., a fatty acid amide having a softening point of 60 to 170° C., graphite, and optionally a fluororesin. The metal-rubber laminate material, in which the metal plate and the rubber layer are bonded through a primer layer and an adhesive layer in this order, exhibits excellent effects, such as fretting resistance, when used as a metal gasket in an internal combustion engine for an automobile engine, etc.

7 Claims, No Drawings

METAL-RUBBER LAMINATE MATERIAL

RELATED APPLICATION

This application is a 35 U.S.C. § 371 national phase filing of International Patent Application No. PCT/JP2012/050135, filed Jan. 6, 2012, through which and to which priority is claimed under 35 U.S.C. § 119 to Japanese Patent Application No. 2011-003578, filed Jan. 12, 2011.

TECHNICAL FIELD

The present invention relates to a metal-rubber laminate material. More particularly, the present invention relates to a metal-rubber laminate material that can be effectively used as a metal gasket suitable for use in an internal combustion engine for an automobile engine, etc.

BACKGROUND ART

As described in Patent Document 1, in an internal combustion engine for an automobile engine, etc., the joint surfaces of flanges fastened by a bolt undergo a phenomenon to be a fretting state in which fretting caused by horizontal sliding (horizontal fretting) or opening (increase in the distance between the joint surfaces) occurs repeatedly because of vibration, thermal expansion, or the like. In order to prevent with this phenomenon, a metal gasket is used between the flange joint surfaces to seal fluid flowing in a fluid passage. In this case, however, there are problems that friction occurs repeatedly between the flange joint surfaces and a bead portion of the metal gasket, particularly in the projected portion of the bead portion, so that the rubber layer bonded to the metal plate of the metal gasket is worn and peeled off early in the projected portion, causing a significant reduction in sealing properties.

Patent Document 1 mentioned above proposes a composite material for a metal gasket with a bead, the composite material comprising a rubber layer and a solid lubricant layer bonded to the rubber layer, wherein the solid lubricant layer comprises PTFE (9 to 40 wt. %), carbon black (1 to 10 wt. %), a urethane resin (35 to 57 wt. %), a silicone resin (5 to 40 wt. %), and NBR (5 wt. % or less) or graphite (3 wt. % or less), and has a friction coefficient of 0.15 or less.

In addition to this proposal, the following various proposals are made to solve the problem of fretting wear (surface damage generated when a slight relative motion is periodically repeated between two contact surfaces).

(a) A method for reducing friction caused by fretting, by applying an inorganic powder-based solid lubricant, such as graphite or molybdenum disulfide, to the surface of the bonded rubber layer.

According to this method, the inorganic powder-based solid lubricant has a low friction-reducing effect, and the effect is not expected until familiarity (transfer) of the solid lubricant to the flange joint surfaces is generated. Accordingly, when high-load fretting occurs in the initial state, the bonded rubber layer is worn.

(b) A method for reducing friction caused by fretting, by applying a liquid lubricant, such as wax, oil, or fatty acid, to the surface of the bonded rubber layer.

According to this method, the liquid lubricant undergoes long-term deterioration when the metal gasket is used under severe temperature conditions, and the effect of reducing friction is lost. Depending on the type of fluid to be sealed, the liquid lubricant is eluted and lost into the fluid. Consequently, friction becomes high, resulting in the wear of the bonded rubber layer.

(c) A method for improving wear resistance by increasing the degree of vulcanization of the bonded rubber layer or raising the amounts of carbon black and other filler components in the rubber composition to thereby enhance hardness of the bonded rubber layer.

According to this method, the bonded rubber layer with a high hardness causes a decrease in sealing properties in low surface-pressure areas and in sealing properties in rough surfaces. As a result, the original sealing function of the metal gasket is impaired.

(d) Methods disclosed in Patent Documents 2 and 3 in which the front and back sides of a metal gasket have different frictional resistances so that the metal gasket can slide with respect to one of two joint surfaces that hold the metal gasket.

These methods have drawbacks. That is, since the wear of the bonded rubber layer caused by fretting is absorbed only by one side of the gasket, the degree of decrease in sealing properties become lower; however, this is not a fundamental solution because the wear of the rubber layer is not completely eliminated. Moreover, when the surface of the gasket on the side on which fretting occurs has a part for which high seal performance is required (a high surface pressure seal part, a fuel seal part, etc.), these methods cannot be employed.

PRIOR ART DOCUMENT

Patent Document

Patent Document 1: JP-B-3875481
Patent Document 2: JP-U-2-59362
Patent Document 3: JP-U-3-124075

OUTLINE OF THE INVENTION

Problem to be Solved by the Invention

An object of the present invention is to provide a metal-rubber laminate material comprising a metal plate, a rubber layer formed on the surface of the metal plate, and a solid lubricant layer formed on the rubber layer, the laminate material exhibiting excellent effects, such as fretting resistance, when used as a metal gasket in an internal combustion engine for an automobile engine, etc.

Means for Solving the Problem

The above object of the present invention can be achieved by a metal-rubber laminate material comprising a metal plate, a rubber layer formed on the surface of the metal plate, and a solid lubricant layer formed on the rubber layer, the solid lubricant layer comprising an isocyanate group-containing urethane prepolymer, a synthetic wax having a softening point of 40 to 150° C., a fatty acid amide having a softening point of 60 to 170° C., graphite, and optionally a fluororesin.

Effect of the Invention

When used as a metal gasket, the metal-rubber laminate material of the present invention can effectively prevent wear of the bonded rubber layer formed on the surface of the metal plate. Even when the metal-rubber laminate material of the present invention is used under severe temperature conditions, not only the loss of the friction force-reducing effect due to long-term deterioration can be prevented, but also the loss of the lubricant eluted into fluid targeted for sealing can be prevented. This ensures sealing properties that are always stable over a long period of time.

Furthermore, the metal-rubber laminate material of the present invention can prevent wear of the bonded rubber layer without the need of increasing the hardness of the rubber layer. Accordingly, sealing properties are not reduced in low surface pressure areas and rough surfaces, and therefore the original sealing function of the metal gasket can be effectively maintained. In addition, wear of the bonded rubber layer caused by fretting can be prevented on both sides of the gasket; thus, when the surface of the gasket on the side on which fretting occurs has a part for which high seal performance is required (e.g., a high surface pressure seal part or a fuel seal part), such requirements can be sufficiently satisfied.

More specifically, the following effects can be provided:

(1) Coating properties of a coating agent, which is the solid lubricant, are excellent.

(2) No blocking occurs between rubbers that are surface-treated with the solid lubricant.

(3) The surface of the rubber layer after surface treatment has low friction and low sliding, and thus has excellent mounting workability.

(4) Many chemical bonds are formed between the coating agent and the functional groups of the rubber. This imparts durability and non-adhesive properties at high temperatures to the surface-treated rubber, which thereby has less adhesion and stickiness to metal. The same effect can be achieved at high temperatures.

(5) The chemical bonding with the rubber layer enables the performances, such as low friction and low sliding, to continue, and rubber wear can be reduced.

(6) Sufficient performance is achieved even when the coating thickness is, for example, 5 µm or less, causing no uneven coating and allowing low-cost treatment.

(7) Even when the coating thickness is as low as mentioned above, sliding properties and non-adhesive properties are not inferior, flexibility is ensured, and the physical properties of the rubber are therefore not impaired. In particular, for use in seal parts, excellent sealing properties are developed.

(8) Since an isocyanate group-containing urethane prepolymer is compounded, the graphite and fluororesin adhere to the rubber layer so firmly that they are rarely removed.

(9) Conventional surface-treated films containing a fluororesin are hard. When they are used in seal parts, seal performance is reduced, and crack occurs in the coating due to repeated compression and release, and peeling occurs. These problems can be solved by using the coating agent of the present invention to form a solid lubricant layer.

(10) Compounding of a fatty acid amide results not only in high lubricity at high temperatures and excellent friction wear resistance at high temperatures, but also in excellent flexibility of the coating, and does not impair adhesion to the rubber layer.

(11) Due to the addition of graphite and a fluororesin, which undergo few characteristic changes even at a high temperature of about 200° C., prevention of adhesion can be maintained at high temperatures.

EMBODIMENTS FOR CARRYING OUT THE INVENTION

The rubber layer formed on the surface of the metal plate is preferably bonded to the metal plate generally through a primer layer and an adhesive layer in this order.

Usable examples of the metal plate are plates of stainless steel, soft steel, galvanized steel, SPCC steel, copper, magnesium, aluminum, aluminum die casting, or the like. For use in metal gaskets, plates with a thickness of about 2 mm or less are generally used. These metal plates are typically used after de greasing treatment. In some cases, the metal plates are used after their surface is roughened by shot blast, Scotch Brite®, hairline, dull finish, or other methods.

The primer layer is made of a zinc phosphate film, an iron phosphate film, a coating-type chromate film (not preferred); an inorganic film comprising an oxide of vanadium, zirconium, titanium, molybdenum, tungsten, manganese, zinc, or cerium, or comprising a compound other than an oxide; or an organic film, such as silane-, phenol-, epoxy-, or urethane-based film. Such a film can form a primer layer using a commercially available film-forming chemical as it is. Examples described later employ a solution prepared by dissolving a copolymerization oligomer of γ-aminopropyltriethoxysilane and vinyltriethoxysilane, and an organometallic compound in an aqueous methanol solution.

For the adhesive layer, various commercially available adhesives, such as silane-, phenol-, epoxy-, or urethane-based adhesives, can be used as they are, depending on the type of rubber used to form a rubber layer on the surface of the metal plate. For example, the below-mentioned Examples, in which a nitrile rubber layer is formed, employ a phenol-based adhesive that is an organic solvent solution comprising an unvulcanized NBR, a resol-type phenol resin, and chlorinated polyethylene.

Examples of rubbers that can be treated with the coating agent (solid lubricant) of the present invention include various synthetic rubbers, such as nitrile rubber, hydrogenated nitrile rubber, fluororubber, ethylene-propylene(-diene) copolymer rubber, styrene-butadiene rubber, acrylic rubber, chloroprene rubber, and butyl rubber; and natural rubbers. Among these various rubbers, nitrile rubber, hydrogenated nitrile rubber, and fluororubber are preferably used. The rubber layer is generally formed to a thickness of about 15 to 200 µm, preferably about 20 to 100 µm.

On the rubber layer, the coating agent as a solid lubricant is applied to a coating thickness of about 0.5 to 10 µm, preferably about 1 to 5 µm. In the total solids content of the coating agent, the proportion of the isocyanate group-containing urethane prepolymer is about 20 to 70 wt. %, preferably about 30 to 60 wt. %; the proportion of the synthetic wax is 10 to 50 wt. %, preferably about 13 to 40 wt. %; the proportion of the fatty acid amide is about 10 to 50 wt. %, preferably about 13 to 40 wt. %; the proportion of the graphite is 5 to 40 wt. %, preferably 10 to 30 wt. %; and the proportion of the fluororesin is 0 to 50 wt. %, preferably about 10 to 40 wt. %. The total amount of these components is 100 wt. %.

The isocyanate group-containing urethane prepolymer is obtained by reacting a polyol containing an active hydrogen group with an isocyanate in an equivalent 1.1 to 5 times, preferably 1.5 to 3 times, based on the equivalent of the active hydrogen group, and has an isocyanate group as the terminal group.

Usable examples of the polyol having an active hydrogen group include polyester polyol, polyether polyol, polycarbonate polyol, acrylic polyol, and the like.

Polyester polyols are condensation polymerization reaction products of dicarboxylic acids and polyols. Examples of dicarboxylic acids include at least one aromatic, aliphatic, or alicyclic dicarboxylic acid selected from isophthalic acid, terephthalic acid, phthalic anhydride, isophthalic acid dimethyl ester, terephthalic acid dimethyl ester, adipic acid, azelaic acid, sebacic acid, glutaric acid, hexahydrophthalic anhydride, etc.; and lower alkyl esters thereof or acid anhydrides thereof. Examples of polyols include at least one member selected from ethyleneglycol, diethyleneglycol, triethyleneglycol, polyethyleneglycol, trimethylolpropane, propyleneglycol, dipropyleneglycol, 1,4-butanediol, 1,6-hexanediol, neopentylglycol, 2,2,4-trimethylpentane-1,3-diol, hydrogenated bisphenol A, 1,4-cyclohexanediol, and the like. Alternatively, ring-opening-polymerization products of caprolactone, etc., can be used. Usable polyester polyols generally have a number average molecular weight (Mn) of about 100 to 50,000, preferably about 500 to 5,000.

Examples of polyether polyols include at least one member selected from polyetherdiol obtained by adding propylene oxide [PO] to propyleneglycol or polypropyleneglycol; polyetherdiol obtained by adding PO to bisphenol A; polyethertriol obtained by adding PO to glycerin; tetraol obtained by adding PO to the active hydrogen of ethylenediamine; polyether polyol obtained by adding PO to sorbitol or sucrose; polyether diol that is made highly reactive by adding ethylene oxide to the terminal hydrogen group of polyetherpolyol; and the like. Usable polyether polyols generally have a number average molecular weight (Mn) of about 100 to 50,000, preferably about 500 to 5,000.

Polycarbonate polyols are obtained by heating polycarbonate diols with triols, and/or tetraols while stirring in the presence of a catalyst in a nitrogen atmosphere at a temperature of about 150 to 240° C. for about 5 to 15 hours to perform a transesterification reaction. Examples of polycarbonate diols include polycarbonate derivatives, with ethyleneglycol, diethyleneglycol, triethyleneglycol, tetraethyleneglycol, tripropyleneglycol, polypropyleneglycol, 1,2-propanediol, 1,3-butanediol, 2-methyl-1,3-butanediol, neopentylglycol, hydroxypivalic acid ester of neopentylglycol, 2-methyl pentanediol, 3-methyl pentanediol, 2,3,5-trimethyl pentanediol, 1,6-hexanediol, 2,2,4-trimethyl-1,6-hexanediol, 3,3,5-trimethyl-1,6-hexanediol, etc. Examples of triols include aliphatic triols, such as trimethylolpropane, trimethylolethane, and glycerin. Examples of tetraols include aliphatic tetraols, such as pentaerythritol and ditrimethylolpropane. Usable polycarbonate polyols generally have a number average molecular weight (Mn) of about 100 to 50,000, preferably about 500 to 5,000.

Examples of acrylic polyols include copolymers of hydroxyl group-containing monomers and α,β-ethylenically unsaturated monomers other than the hydroxyl group-containing monomers. Examples of hydroxyl group-containing monomers include 2-hydroxyethyl acrylate, 2-hydroxypropyl acrylate, 3-hydroxypropyl acrylate, 2-hydroxyethyl methacrylate, 2-hydroxypropyl methacrylate, 3-hydroxypropyl methacrylate, allyl alcohol, and reaction products of aliphatic unsaturated carboxylic acids, such as acrylic acid, methacrylic acid, maleic acid, fumaric acid, or itaconic acid, with ethyleneglycol, ethylene oxide, propyleneglycol, propylene oxide, or the like. Examples of α,β-ethylenically unsaturated monomers other than hydroxyl group-containing monomers include alkyl acrylates, such as methyl acrylate, ethyl acrylate, propyl acrylate, and 2-ethylhexyl acrylate; and their corresponding alkyl methacrylates; styrene monomer, acrylic acid, methacrylic acid, acrylamide, glycidyl methacrylate, ethylene, and the like. Usable acrylic polyols generally have a number average molecular weight (Mn) of about 100 to 50,000, preferably about 500 to 5,000.

All of these various polyols having an active hydrogen group are commercially available.

Examples of isocyanates reactive with the polyol having an active hydrogen group include aromatic or aliphatic diisocyanates, such as tolylene diisocyanate, 4,4'diphenylmethane diisocyanate, dianisidine diisocyanate, tolidine diisocyanate, hexamethylene diisocyanate, m-xylylene diisocyanate, 1,5-naphthalene diisocyanate, and trans-vinylene diisocyanate; triisocyanates, such as triphenylmethane triisocyanate; and aromatic or aliphatic monoisocyanates, such as phenyl isocyanate, p-chlorophenyl isocyanate, o-chlorophenyl isocyanate, m-chlorophenyl isocyanate, 3,4-dichlorophenyl isocyanate, 2,5-dichlorophenyl isocyanate, methyl isocyanate, ethyl isocyanate, propyl isocyanate, n-butyl isocyanate, octadecyl isocyanate, and polymethylene polyphenyl isocyanate. All of these various isocyanates are commercially available.

The isocyanate group-containing urethane prepolymer obtained by reacting a polyol having an active hydrogen group and an isocyanate is used in the aforementioned ratio in the solid matters that form the solid lubricant. When the proportion of the urethane prepolymer is less than this range, removal of the graphite and fluororesin often occurs in the solid lubricant, reducing friction wear resistance and adhesion to the rubber layer. In contrast, when the proportion of the urethane prepolymer is greater than this range, adhesion to the rubber layer is excellent; however, sliding properties and friction wear resistance decrease, while adhesive force increases.

Examples of synthetic waxes include paraffin wax, polyethylene wax, microcrystalline wax, and other various modified waxes that have a softening point (measured according to JIS K5601-2-2 corresponding to ISO 4625) of about 40 to 150° C., preferably about 60 to 100° C. In general, commercially available waxes can be used as they are.

The use of synthetic wax results in more lubrication at high temperatures, and thus enhances wear resistance at high temperatures. However, when the synthetic wax content is greater than the above range, the solid lubricant is softened at high temperatures, and adhesion and film strength decrease, thereby reducing hot wear resistance. Moreover, when a synthetic wax having a softening point higher than this range is used, sliding properties and non-adhesive properties are diminished. On the contrary, when a synthetic wax having a softening point less than this range is used, adhesion between the rubber layer and the coating agent, and friction wear resistance become lower.

Usable fatty acid amides have a softening point (measured according to JIS K5601-2-2 corresponding to ISO 4625) of about 60 to 170° C., preferably about 70 to 120° C. As the softening point is lower, sliding properties and lubricity are more excellent; however, stickiness occurs at normal temperature, and non-adhesive properties are diminished. In contrast, when the softening point is greater than this range, sliding properties and lubricity are impaired.

Examples of fatty acid amides having such a softening point include fatty acid amides, such as oleic acid amide, stearic acid amide, and lauric acid amide; N-substituted fatty acid amides, such as ethylenebisstearic acid amide, stearylstearic acid amide, methylolstearic acid amide, ethylenebislauric acid amide, and hexamethylenebisoleic acid amide; and N-substituted aromatic amides, such as xylylenebisstearic acid amide.

Such a fatty acid amide is used in the aforementioned ratio in the solid matters of the coating agent that forms the solid lubricant. When no fatty acid amide is used, measurement items show inferior results, as shown in the results of Comparative Example 6, described later. Comparatively, when the fatty acid amide content is greater than the above range, an adhesion test performed at a high temperature results in inferior adhesion to rubber, and transfer to the mating material occurs.

Usable examples of graphite include flake graphite, soil graphite, artificial graphite, and the like. Graphite is used in the aforementioned ratio in the solid matters of the coating agent. The graphite content outside of the specified range results in the same behavior as in the wax. More specifically, when the graphite content is greater than the above range, adhesion to the rubber layer decreases, and friction wear resistance characteristics drops. In contrast, when the graphite content is less than the above range, adhesion to the rubber layer is excellent, while sliding properties and adhesive force increase.

The solid lubricant, which comprises the above components, preferably contains a fluororesin in a ratio of about 50 wt. % or less, preferably about 10 to 40 wt. %. The addition of a fluororesin makes the action of the solid lubricant more effective in terms of sliding properties and non-adhesive properties. However, when the fluororesin content is greater than this range, adhesion to the rubber layer, friction wear resistance characteristics, and sealing properties are impaired. In addition, the film loses flexibility, and cracks occur in the cured coating film, thereby spoiling the appearance.

Examples of fluororesins include polytetrafluoroethylene [PTFE], tetrafluoroethylene/hexafluoropropylene copolymers, tetrafluoroethylene/perfluoro(alkyl vinyl ether) copolymers, polyvinylidene fluoride, polyvinyl fluoride, ethylene/tetrafluoroethylene copolymers, and the like. Such fluororesins are prepared, for example, in the following manner: fluororesins obtained by block polymerization, suspension polymerization, solution polymerization, emulsion polymerization, or the like are classified into a particle size of about 0.1 to 10 μm; a dispersion obtained by suspension polymerization, solution polymerization, emulsion polymerization, or the like is dispersed into fine particles with a particle size of about 0.1 to 10 μm by shear-stirring, etc.; or a product obtained by such a polymerization method is coagulated and dried, followed by dry grinding or cool grinding to obtain fine particles with a particle size of about 10 μm or less. In the particle size range of 0.1 to 10 μm, smaller particle sizes are advantageous in that the coating thickness can be reduced; however, because the coating surface is less irregular, the area of contact is reduced, and wear coefficient tends to increase at low surface pressure. On the contrary, when the particle size is larger, the coating thickness increases, and coating costs are more expensive, while the coating surface is more irregular, and the area of contact with the mating material is reduced at low surface pressure, and friction coefficient decreases. Therefore, the particle size is suitably adjusted depending on use requirements, and is preferably about 0.5 to 5 μm.

The solid lubricant components are prepared into a solution or dispersion of an organic solvent or water to form a coating solution. The concentration of the coating solution is suitably selected depending on the coating thickness, coating method, and other conditions; however, the coating solution is preferably prepared as an organic solvent dispersion having a solid matters content of about 2 to 50 wt. %. Examples of the organic solvent include hydrocarbon-, ester-, or ketone-based organic solvents, such as toluene, xylene, ethyl acetate, butyl acetate, acetone, methyl ethyl ketone, methyl isobutyl ketone, dipropyl ketone, cyclohexanone, phorone, cyclohexanone, isophorone, ethyl cellosolve, and methyl cellosolve.

The application of the coating solution to the rubber layer can be performed by any method, such as dipping, spraying, roll coater, or flow coater. Depending on the type of rubber to be applied to form a rubber layer, heat treatment is carried out under heating conditions that allow sufficient curing of the film and ensures sufficient adhesion (i.e., at a temperature of about 150 to 250° C.) for about 1 minute to about 24 hours.

The thickness of the solid lubricant layer after heat treatment is generally about 1 to 10 μm, preferably about 2 to 5 μm. When the coating thickness is less than this range, not the entire surface of the rubber layer can be covered, and slide properties and non-adhesive properties may be impaired. On the contrary, when the coating thickness is greater than this range, the surface of the coating film is more rigid, and sealing properties and flexibility are impaired.

EXAMPLES

The following describes the present invention with reference to Examples.

Example 1

A stainless steel plate (SUS301, produced by Nisshin Steel Co., Ltd.; thickness: 0.2 mm) was treated sequentially with a silane-based primer and a phenol resin-based adhesive. Then, a solution prepared by adding a nitrile rubber composition to a toluene/methyl ethyl ketone (weight ratio: 90/10) mixed solvent to a solid matters content of 25 wt. % was applied thereto so that the thickness after drying was 20 μm, followed by press vulcanization at 180° C. for 6 minutes. A coating agent having a solid matters content of 6.2 wt. % was applied to the vulcanized layer by dipping, followed by heat treatment at 200° C. for 2 minutes, thereby forming an anti-adhesion layer with a thickness of 5 μm.

Silane-Based Primer:

In a three-necked flask equipped with a stirrer, a heating jacket, and a dropping funnel, 40 parts (by weight, hereinafter the same) of γ-aminopropyltriethoxysilane and 20 parts of water were charged, and acetic acid was added to adjust the pH to 4 to 5. After stirring for several minutes, 40 parts of vinyltriethoxysilane was gradually added dropwise from the dropping funnel while continuing stirring. After completion of dropping, the resulting mixture was heated under reflux at about 60° C. for 5 hours, and then cooled to room temperature, thereby yielding a copolymerization oligomer. The copolymerization oligomer (2.5 parts), 1.0 parts of titanium tetra(acetylacetonate), 86.5 parts of methanol, and 10.0 parts of water were mixed and stirred for several minutes, thereby obtaining a silane-based primer.

Phenol Resin-Based Adhesive:

An unvulcanized NBR (2 parts; N-237, middle-high nitrile, produced by JSR Corporation) was added to 90 parts of methyl ethyl ketone. Then, 5 parts of a resol-type phenol resin (Chemlok TS 1677-13, produced by Lord Far East, Inc.) and 3 parts of chlorinated polyethylene (Superchlon, produced by Nippon Paper Chemicals Co., Ltd.; chlorine content: 45 wt. %) were added. Thus, a phenol resin-based adhesive comprising the methyl ethyl ketone solution of these components was obtained.

Nitrile Rubber Composition:

| | |
|---|---|
| NBR (N-235S, produced by JSR Corporation; CN content: 36%) | 100 parts |
| SRF carbon black | 80 parts |
| White carbon (Nipseal LP, produced by Nippon Silica Corporation) | 40 parts |
| Zinc oxide | 5 parts |
| Stearic acid | 2 parts |
| Antioxidant (Nocrac 224, produced by Ouchi Shinko Chemical Industrial Co., Ltd.) | 2 parts |
| (N-isopropyl-N'-phenyl-p-phenylenediamine) Triallyl isocyanurate | 2 parts |
| 1,3-bis(tert-butylperoxy)isopropyl benzene | 7.5 parts |

Coating Agent:

| | |
|---|---|
| Isocyanate group-containing urethane prepolymer A (prepared from 100 parts of polypropyleneglycol and 3 parts of isocyanate Desmodur RE, produced by Bayer Material Science) | 44.5 parts (60 wt. %) |
| Paraffin wax (produced by Seiko Chemical Co., Ltd.; melting point: 80° C.; a dispersion having a particle size of 2 μm or less and containing 85 wt. % of toluene) | 73 parts (14.75 wt. %) |
| Oleic acid amide (Diamid 0-200, produced by Nippon Kasei Chemical Co., Ltd.; softening point: 75° C.; a dispersion having a particle size of 2 μm or less and containing 85 wt. % of toluene) | 73 parts (14.75 wt. %) |
| Graphite (C-1, produced by Nichiden Carbon Co., Ltd.) | 7.8 parts (10.5 wt. %) |
| Toluene | 791 parts |
| (Total) | 989.3 parts (100 wt. %) |

Using a metal-rubber composite material in which a coating agent layer (coating thickness: 3 μm) was formed on a stainless steel plate through a silane-based primer layer, a phenol resin-based adhesive layer, and a vulcanized nitrile rubber layer, the following items were measured.

Dynamic Friction Coefficient:

According to JIS K7125, B8147 corresponding to ISO 8295

The dynamic friction coefficient was measured by a surface tester (produced by Shinto Scientific Co., Ltd.) under conditions in which the mating material was a hard chromium steel ball friction block (diameter: 10 mm), the movement speed was 50 mm/min, and the load was 50 g.

High-Temperature Adhesion Test with Al Plate:

An aluminum plate (60×25 mm) was pressure-bonded to the coating agent layer side of the metal-rubber composite material (60×25 mm) under conditions in which the bonding area was 25×25 mm, the temperature was 200 "C, the time was 72 hours, and the pressure was 200 kgf/cm$^2$ (19.6 MPa). The tensile shear adhesion strength (according to JIS K6850 corresponding to ISO 4587) was measured under room temperature conditions, and the results were used as the surface adhesion.

Fretting Test:

According to JIS K7125, P8147 corresponding to ISO 8295

Using a surface tester (produced by Shinto Scientific Co., Ltd.), frictional wear was evaluated under conditions in which the mating material was a hard chromium steel ball friction block (diameter: 10 nm), the movement speed was 400 mm/min, the reciprocating moving width was 30 mm, and the load was 5 kg (at room temperature) or 2.5 kg (at 150° C.). The number of times until the rubber layer was worn and the adhesive layer was exposed was measured.

Example 2

In Example 1, the same amount (73 parts) of polyethylene wax (produced by Mitsui Chemicals, Inc.; melting point: 110° C.; a dispersion having a particle size of 2 μm or less and containing 85 wt. % of toluene) was used in place of the paraffin wax.

Example 3

In Example 2, 120 parts of polytetrafluoroethylene fine powder (particle size: 1 μm; toluene content: 85 wt. %) was further used, and the amount of graphite was changed to 10 parts, the amount of toluene was changed to 939 parts, and the total amount was changed to 1,259.5 parts.

Example 4

In Example 2, the same amount (44.5 parts) of isocyanate group-containing urethane prepolymer B (prepared from 100 parts of polyester polyol resin (D6-439, produced by DIC Corporation) and 60 parts of isocyanate DN980, produced by DIC Corporation) was used in place of the isocyanate group-containing urethane prepolymer A.

Example 5

In Example 2, the same amount (44.5 parts) of isocyanate group-containing urethane prepolymer C (prepared from 100 parts of acrylic polyol resin (UMB-2005, produced by Soken Chemical & Engineering Co., Ltd.) and 6 parts of isocyanate Desmodur RE) was used in place of the isocyanate group-containing urethane prepolymer A.

Table 1 below shows the results obtained in the above Examples, together with the solid matter amounts (unit: part) of the coating agent components, other than toluene, and their percentages (unit: wt. %; shown in parentheses). The solid matters content in each coating agent is 7.5 wt. %.

TABLE 1

| | (Examples) | | | | |
|---|---|---|---|---|---|
| | 1 | 2 | 3 | 4 | 5 |
| [Coating agent compound] | | | | | |
| Urethane prepolymer | 44.5 (60.0) | 44.5 (60.0) | 44.5 (47.1) | 44.5 (60.0) | 44.5 (60.0) |
| Wax | 10.95 (14.75) | 10.95 (14.75) | 10.95 (11.5) | 10.95 (14.75) | 10.95 (14.75) |
| Fatty acid amide | 10.95 (14.75) | 10.95 (14.75) | 10.95 (11.5) | 10.95 (14.75) | 10.95 (14.75) |
| Graphite | 7.8 (10.5) | 7.8 (10.5) | 10 (10.6) | 7.8 (10.5) | 7.8 (10.5) |
| PTFE fine powder | — (0) | — (0) | 18 (19.1) | — (0) | — (0) |
| Total amount | 74.2 (100) | 74.2 (100) | 94.4 (100) | 74.2 (100) | 74.2 (100) |

TABLE 1-continued

| | (Examples) | | | | |
|---|---|---|---|---|---|
| | 1 | 2 | 3 | 4 | 5 |
| [Measurement results] | | | | | |
| Dynamic friction (—) | 0.2 | 0.2 | 0.1 | 0.3 | 0.4 |
| Al plate high-temperature adhesion (kgf) | 2 | 10 | <0.1 | 20 | 30 |
| Fretting test | | | | | |
| Room temperature, 5 kg (number of times) | 350 | 400 | 150 | 300 | 200 |
| 150° C., 2.5 kg (number of times) | 150 | 250 | 600 | 120 | 100 |

Comparative Example 1

In Example 1, oleic acid amide and graphite were not used, and the amount of paraffin wax was changed to 198 parts, the amount of toluene was changed to 747 parts, and the total amount was changed to 989.5 parts.

Comparative Example 2

In Comparative Example 1, the same amount (198 parts) of polyethylene wax was used in place of the paraffin wax.

Comparative Example 3

In Comparative Example 1, the same amount (198 parts) of oleic acid amide was used in place of the paraffin wax.

Comparative Example 4

In Comparative Example 1, the same amount (198 parts) of polytetrafluoroethylene fine powder was used in place of the paraffin wax.

Comparative Example 5

In Comparative Example 2, 99 parts of polyethylene wax and 99 parts of oleic acid amide were used in place of 198 parts of the polyethylene wax.

Comparative Example 6

In Comparative Example 1, 29.7 parts of graphite was used in place of the paraffin wax, and the amount of toluene was changed to 915 parts, and the total amount was changed to 989.2 parts.

Table 2 shows the results obtained in the above Comparative Examples, together with the solid matter amounts (unit: part) of the coating agent components, other than toluene, and their percentages (unit: wt. %; shown in parentheses). The solid matters content in each coating agent is 7.5 wt. %.

TABLE 2

| | (Comparative Examples) | | | | | |
|---|---|---|---|---|---|---|
| | 1 | 2 | 3 | 4 | 5 | 6 |
| [Coating agent component] | | | | | | |
| Urethane prepolymer | 44.5 (60.0) | 44.5 (60.0) | 44.5 (60.0) | 44.5 (60.0) | 44.5 (60.0) | 44.5 (60.0) |
| Synthetic wax | 29.7 (40.0) | 29.7 (40.0) | — (0) | — (0) | 14.85 (20.0) | — (0) |
| Fatty acid amide | — (0) | — (0) | 29.7 (40.0) | — (0) | 14.85 (20.0) | — (0) |
| Graphite | — (0) | — (0) | — (0) | — (0) | — (0) | 29.7 (40.0) |
| PTFE fine powder | — (0) | — (0) | — (0) | 29.7 (40.0) | — (0) | — (0) |
| Total amount | 74.2 (100) | 74.2 (100) | 74.2 (100) | 74.2 (100) | 74.2 (100) | 74.2 (100) |
| [Measurement results] | | | | | | |
| Dynamic friction (—) | 0.2 | 0.5 | 0.2 | 0.1 | 0.3 | 0.4 |
| Al plate high-temperature adhesion (kgf) | 200 | 300 | 100 | 70 | 200 | 60 |
| Fretting test | | | | | | |
| Room temperature, 5 kg (number of times) | 100 | 200 | 150 | 300 | 200 | 80 |
| 150° C., 2.5 kg (number of times) | 40 | 120 | 80 | 80 | 100 | 20 |

The invention claimed is:
1. A metal-rubber laminate material comprising:
a metal plate;
a rubber layer formed on the surface of the metal plate; and
a solid lubricant layer formed on the rubber layer, the solid lubricant layer formed by applying a coating agent composition as a solution or a dispersion on the rubber layer and curing the coating agent composition, wherein the solids content of the coating agent composition consists of 20 to 69 wt. % of an isocyanate group-containing urethane prepolymer, 13 to 49 wt. % of a synthetic wax having a softening point of 40 to 150° C., 13 to 50 wt. % of a fatty acid amide having a softening point of 60 to 170° C., 5 to 40 wt. % of graphite, and 0 to 50 wt. % of fluororesin, with the total amount of these components being 100 wt. %, and wherein the isocyanate group-containing urethane prepolymer is obtained by reacting a polyester polyol, polyether polyol, polycarbonate polyol or acrylic polyol with an isocyanate.

2. The metal-rubber laminate material according to claim 1, wherein the fluororesin has a particle size of 0.5 to 5 μm.

3. The metal-rubber laminate material according to claim 1, wherein the metal plate and the rubber layer are bonded through a primer layer and an adhesive layer.

4. The metal-rubber laminate material according to claim 3, which is used as a metal gasket.

5. The metal-rubber laminate material according to claim 4, which is used as a metal gasket in an internal-combustion engine.

6. The metal-rubber laminate material according to claim 5, which is used as a metal gasket in an internal-combustion engine for an automobile engine.

7. A metal gasket for an automobile internal-combustion engine, comprising the metal-rubber laminate material according to claim 3.

* * * * *